United States Patent
Herrmann

(10) Patent No.: US 8,413,794 B2
(45) Date of Patent: Apr. 9, 2013

(54) VARIABLE VACUUM BELT AND PLENUM FOR IMPROVED MEDIA SHEET ACQUISITION AND TRANSPORT

(75) Inventor: Douglas K. Herrmann, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 246 days.

(21) Appl. No.: 12/846,193

(22) Filed: Jul. 29, 2010

(65) Prior Publication Data

US 2012/0024664 A1 Feb. 2, 2012

(51) Int. Cl.
 *B65G 47/91* (2006.01)
(52) U.S. Cl.
 USPC .......................................... 198/689.1; 271/96
(58) Field of Classification Search ............... 198/689.1; 271/90, 94, 96, 276
 See application file for complete search history.

(56) References Cited

U.S. PATENT DOCUMENTS

| | | | | |
|---|---|---|---|---|
| 3,355,166 A | * | 11/1967 | Plumb | 226/95 |
| 4,275,977 A | * | 6/1981 | Joice | 414/790.9 |
| 4,627,608 A | * | 12/1986 | Harms | 271/197 |
| 4,651,984 A | * | 3/1987 | Emrich | 271/237 |
| 5,967,510 A | | 10/1999 | Ono et al. | |
| 6,510,940 B1 | * | 1/2003 | Micciche et al. | 198/689.1 |
| 6,860,086 B2 | * | 3/2005 | Rosloot et al. | 53/441 |
| 7,207,558 B2 | * | 4/2007 | Edinger | 271/197 |
| 7,293,770 B2 | * | 11/2007 | Edinger | 271/276 |
| 8,002,266 B2 | * | 8/2011 | Krause et al. | 271/99 |
| 2011/0139586 A1 | * | 6/2011 | Lin et al. | 198/689.1 |

* cited by examiner

*Primary Examiner* — Gene Crawford
*Assistant Examiner* — Keith R Campbell
(74) *Attorney, Agent, or Firm* — Ronald E. Prass, Jr.; Prass LLP

(57) ABSTRACT

This invention provides a vacuum belt media transport system wherein the media is held on the belt via vacuum pressure. The vacuum force is higher at the media acquisition location and is lower at the subsequent media transport and delivery stage. The vacuum pressure is provided by vacuum plenums located in the system causing vacuum pressure through holes in the belt throughout its length.

8 Claims, 3 Drawing Sheets

VARIABLE VACUUM BELT AND PLENUM FOR IMPROVED MEDIA SHEET ACQUISITION AND TRANSPORT

This invention relates to a vacuum belt media transport system particularly useful in an electrophotographic marking system and other media handling applications.

BACKGROUND

The use of belt transport systems is known including those systems useful in moving media through various marking stations in a xerographic apparatus. In these apparatuses, paper sheets or media are fed to a moving system transport belt. Generally, vacuum belt transport systems used in the prior art will only provide a consistent vacuum force over the length of the transport belt. These prior art transport systems do not provide different levels of variable vacuum. Although these vacuum belt systems consisting of a vacuum suction and a vacuum belt with holes aligned with vacuum plenums may be adequate for providing a consistent vacuum force over the length of a transport, when differing levels of vacuum are needed this arrangement does not provide variable vacuum.

When attempting to acquire media sheets from an upstream transport belt or stack, a higher acquisition vacuum force is often needed to acquire the media to the vacuum belt than is needed to transport the media once it is acquired. Any additional vacuum from acquisition that is translated to the transport portion through continuous plenums running through the transport portion lowers the overall pressure for acquisition due to losses around the media. A typical prior art vacuum transport system is described in U.S. Pat. Nos. 7,293,770 and 5,967,510.

In systems where it is necessary for a vacuum belt transport to both acquire the media and also to transport the media, the additional vacuum needed during acquisition must be balanced with the lower vacuum requirements needed during transport.

Vacuum belt transports make use of aligning belt holes with an underlying vacuum plenum. When the media is covering the holes, the media is pulled against the belt and this force allows the media to be transported along with the belt translation. The more holes in contact with the media the more force can be distributed across the media. However, in the inter-media gap, the holes that are aligned with a plenum will reduce the overall vacuum pressure due to the air volume losses.

SUMMARY OF THE INVENTION

While the vacuum belt media transport system of this invention will be described and illustrated for clarity as having three rows of vacuum holes that at one time align to the 3 rows of vacuum plenums, it should be understood that any suitable number of holes and vacuum plenums may be used provided the vacuum force is greatest or highest at the media acquisition and less or lowest at subsequent media transport and delivery. The media can run along the bottom of the transport belt or top of the transport belt. The three rows of vacuum holes that align to the vacuum plenums are convenient to describe the specifics of this invention.

The present invention uses three parallel rows of vacuum plenums at the acquisition stage and two parallel rows at the transport and delivery stages. During media acquisition, the holes align with the three plenums. At subsequent media transport and media delivery, only the two outside rows of belt vacuum holes align with the two outside plenums.

In one embodiment, this invention uses a varying parallel pattern plenum system to improve media acquisition by increasing vacuum at the acquisition stage of the vacuum belt transport. This invention uses three parallel rows of plenums at the acquisition stage and two parallel rows at the transport and delivery stages along with a vacuum belt with three rows of vacuum holes that align to the plenums. During acquisition, the belt holes align with the three plenums. At transport and delivery, only the two outside rows of belt vacuum holes align with the two outside plenums.

The total vacuum pressure is a function of the amount of vacuum plenum area open to atmosphere through the holes in the belt. By limiting that area by only having a third row of plenums at the acquisition point along with three rows of holes in the belt, the vacuum on the media is higher at acquisition than transport and vacuum loss during transport is minimized by having the middle row of belt holes riding over a non-perforated transport surface.

This invention takes advantage of the fact that transporting a document, media or card requires less vacuum to maintain the necessary force to hold and transport the media than is required at the point where acquisition of the media takes place. At the point of acquisition to the belt from another upstream transport, vacuum belt transport, or stack, higher vacuum is needed to acquire the card and to secure it to the belt.

This invention provides both the higher acquisition vacuum needed while reducing vacuum loss over the length of the vacuum belt transport. This is accomplished by having more rows of belt holes than rows of plenums during the transport phase and an equal number of plenums and belt holes during acquisition. The additional plenums line up with the additional belt holes and provide more vacuum during the acquisition phase. This allows for higher vacuum at only the acquisition phase and reduces the overall vacuum losses. In addition, because the center holes are not aligned with a plenum during the transport phase, hole frequency in the center row can be increased to provide even higher acquisition forces.

DETAILED DISCUSSION OF DRAWINGS AND PREFERRED EMBODIMENTS

Figure 1:
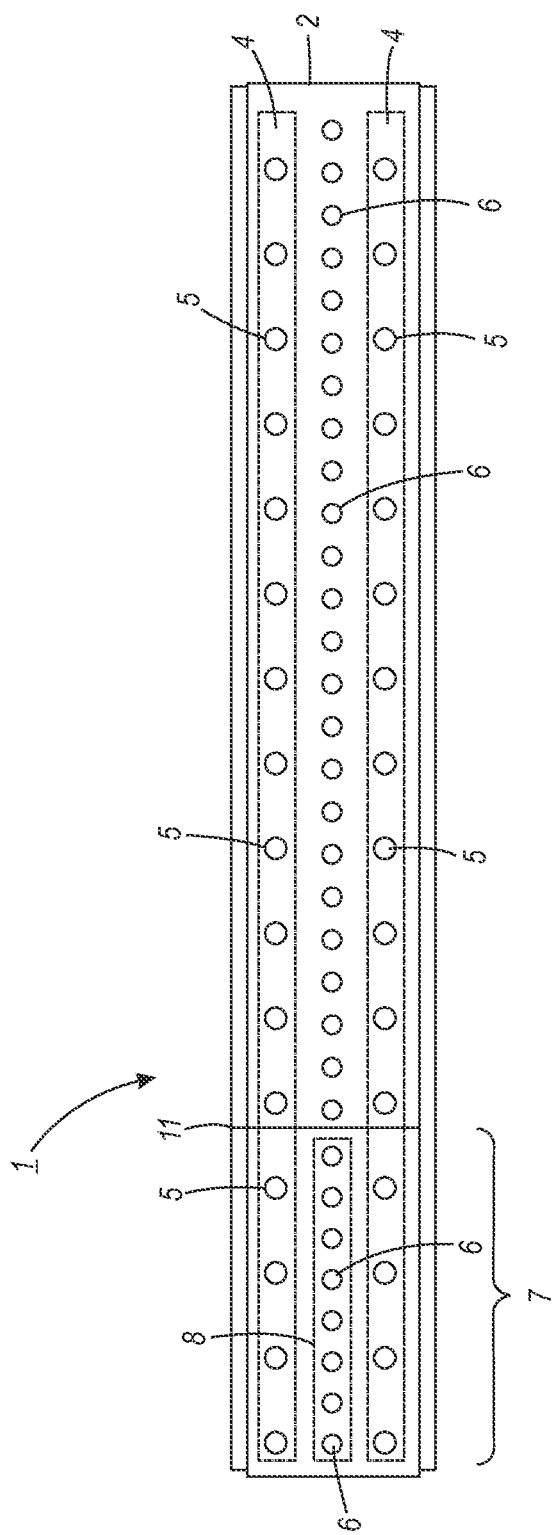
FIG. 1 is a top view of an embodiment of the variable vacuum paper transport system of this invention. This type of transport can be used either for bottom transport or top transport.
Figure 3:
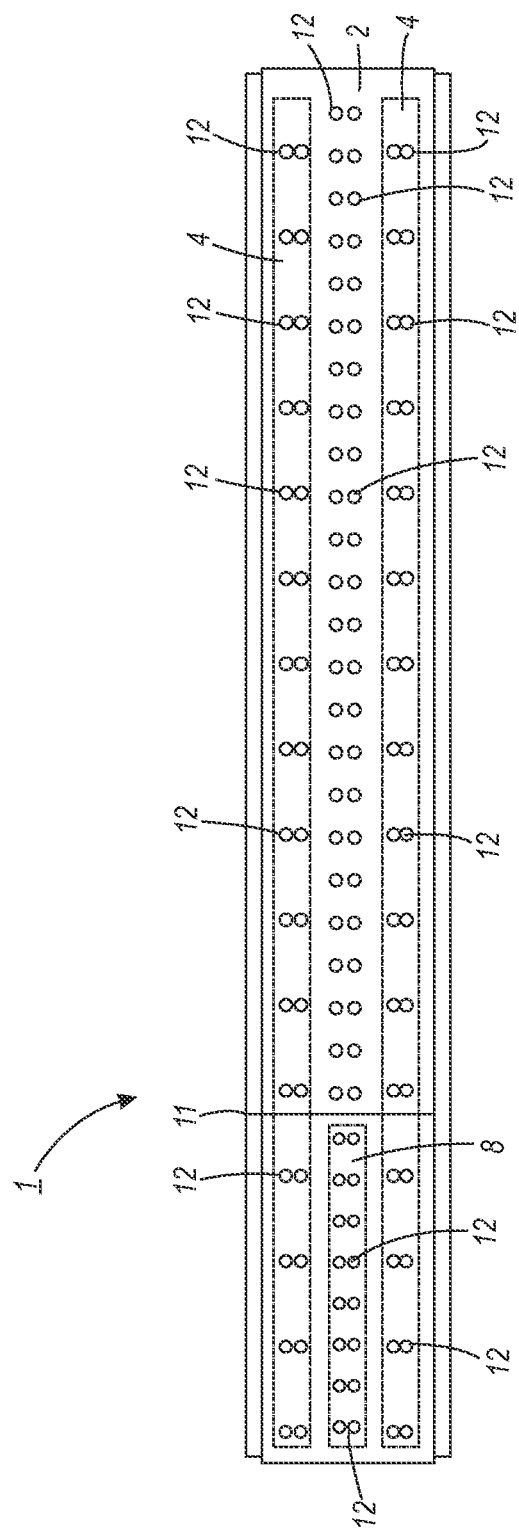
FIG. 3 is a top view of an embodiment of a variable vacuum belt transport system of this invention utilizing six rows of holes rather than the three rows shown in FIG. 1.

In FIGS. 1 and 3, the same invention is being described except in FIG. 1 the embodiment shows 2 rows of vacuum holes 5 and 1 row of center vacuum holes 6 whereas in FIG. 3 there are two vacuum holes for every one shown in FIG. 1.

The present invention uses a variable vacuum belt transport system 1 to improve media acquisition by increasing vacuum at the media acquisition stage 7. In FIG. 1, this invention uses three parallel rows of plenums including center plenum 8 and outer plenums 4 The vacuum belt 2 with these three rows of vacuum holes align to the three plenums 4 and 6 at the acquisition stage 7.

During the transport and delivery of media 10 only the two outside rows of belt holes 5 align with the two outer plenums 4. By adding a center plenum 8 in the acquisition stage 7, increased pressure is provided at the media acquisition stage and less pressure is applied during the media transport and delivery stages. Therefore, the vacuum on the media 10 (as shown in FIG. 2) is higher at acquisition stage than during the media transport stage and vacuum loss during the transport and delivery stages is minimized by having only outer plenums 4 which extend the length of the vacuum belt 2.

Figure 2:
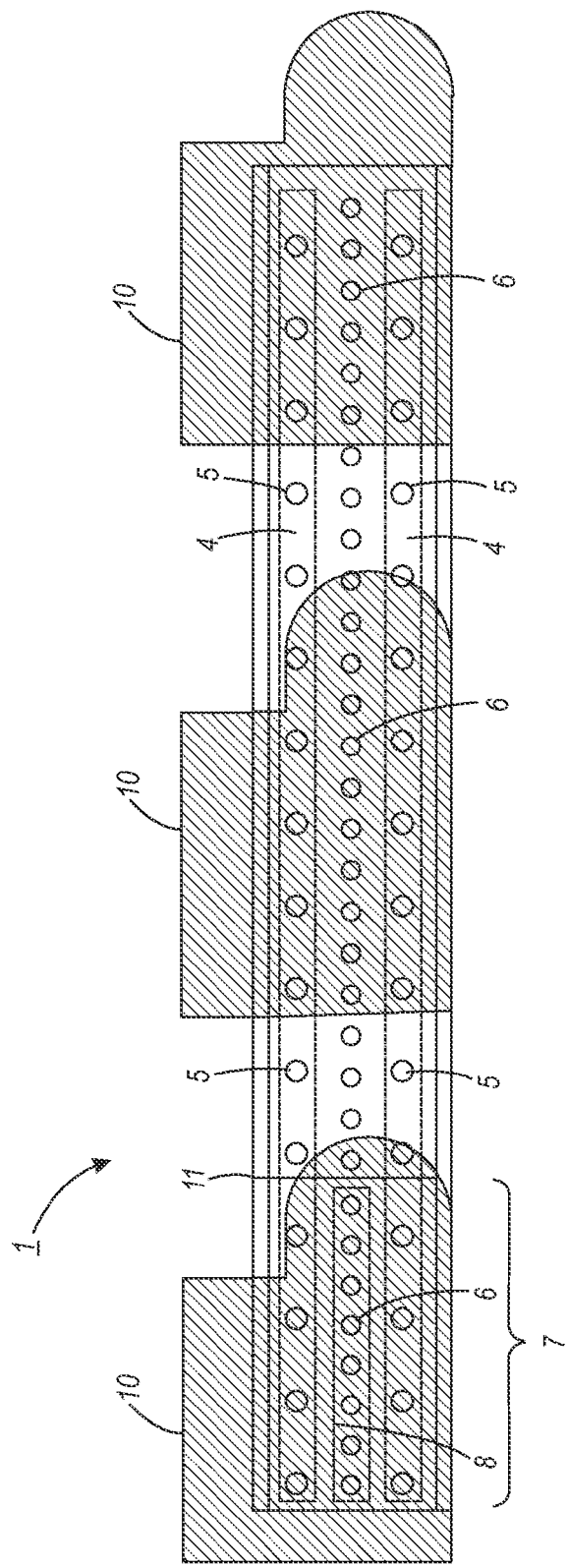
FIG. 2 is a top view of the transport system of FIG. 1 illustrating a semi-transparent card or media acquired and transported to show the underlying plenums.

In FIG. 2, the media or card 10 is shown as being acquired and transported along the variable vacuum belt transport system 1. The acquisition zone 7 extends only to line 11 where the center plenum ends. Once the media or card 10 passes line 11, the vacuum provided at media acquisition is reduced in the area of transport through the elimination of the center plenum. However, the vacuum to the outside rows 5 continues during the transport of the media. There is no center plenum present in the transport stage of the system and thus no vacuum is present at the center row 6 after the acquisition zone 7 ends at line 11.

FIG. 3 has the same description as FIG. 1 except that two rows of holes 12 are used in FIG. 3 rather than one row of holes 5 in FIGS. 1 and 2.

In summary, the present invention involves a vacuum belt media transport system comprising a media acquisition stage located at a beginning of said transport system, and a movable belt having a plurality of holes there through. A plurality of vacuum plenum are positioned underlying the belt. The plenum is aligned with said holes and configured to provide a vacuum force over a length of the belt. The vacuum force is configured to hold down the media on the belt. During the media acquisition stage there is a higher vacuum force present to improve the acquisition of the media. The vacuum force is less on the belt after the acquisition stage, higher at the acquisition stage and lower at the subsequent media transport and delivery stage.

The media transport system is provided wherein three plenums are positioned below the movable belt; the plenum in the acquisition zone ends once the media passes the media acquisition stage. In one embodiment, there are three rows of vacuum holes on the movable belt, two outer rows and center row. The center row is aligned with the plenum only in the acquisition zone. Two outer rows of vacuum holes extend throughout the length of the movable belt. Vacuum force is higher at the acquisition stage and lower at the transport stage since there is no vacuum plenum under the belt after the acquisition stage. Each plenum in the system is aligned with vacuum holes configured to provide some vacuum force over a length of the belt. The vacuum force is less after the acquisition stage since there is no vacuum plenum under the belt after the acquisition stage. The media acquisition is located at a beginning of the transport system and has a zone providing increased vacuum pressure on the media transported thereon.

It will be appreciated that variations of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A vacuum belt media transport system comprising:
a media acquisition stage, a transport stage, and a delivery stage, wherein the media transport stage and the media delivery stage are located subsequent to the media acquisition stage,
a movable belt having a plurality of holes there through arranged in rows, the rows being one or more centermost rows and a plurality of outer rows located toward the outer edge of the belt from the one or more centermost rows, the one or more centermost rows having more holes that are spaced closer than the holes in the plurality of outer rows,
a center vacuum plenum underlying the moveable belt only at the media acquisition stage, the center vacuum plenum being aligned with the centermost holes in the movable belt during the media acquisition stage and configured to provide a vacuum force over a length of the media acquisition stage to attract media to the movable belt,
a plurality of outer vacuum plenums underlying of the movable belt during the media acquisition, transport and delivery stages, the plurality of outer vacuum plenums being aligned with the holes in the movable belt during the media acquisition, transport and delivery stages and configured to provide a vacuum force over a length of the media acquisition, transport and delivery stages,
wherein the holes in the one or more centermost rows of the movable belt and the center vacuum plenum underlying the moveable belt cause the vacuum force to be higher at the media acquisition stage and lower at the subsequent media transport and delivery stages.

2. The media transport system of claim 1, wherein 3 plenums are underlying the movable belt; the center plenum in the media acquisition stage ending once the media passes the media acquisition stage.

3. The media transport system of claim 1, wherein there are 3 rows of vacuum holes on the movable belt, 2 outer rows and 1 centermost row, the 1 centermost row aligned with the center plenum only in the media acquisition stage.

4. The media transport system of claim 3, wherein the 2 outer rows of vacuum holes extend throughout a length of the movable belt.

5. The media transport system of claim 1, wherein the vacuum force is higher at the media acquisition stage since there is no center vacuum plenum after the media acquisition stage.

6. The media transport system of claim 1, wherein each of the outer plenums is aligned with holes in the movable belt to provide a vacuum force over a length of the belt.

7. The media transport system of claim 1, wherein the vacuum force on the media is less after the media acquisition stage.

8. The media transport system of claim 1, wherein the media acquisition stage is located at a beginning of the media transport system, the media acquisition stage providing increased vacuum force on media transported thereon.

* * * * *